(12) United States Patent
Köcher

(10) Patent No.: US 9,062,433 B2
(45) Date of Patent: Jun. 23, 2015

(54) METHOD AND APPARATUS FOR GRADUALLY INTRODUCING THIN-WALLED PIPES INTO THE GROUND

(75) Inventor: Johannes Köcher, Künzell (DE)

(73) Assignee: THYSSENKRUPP TIEFBAUTECHNIK GMBH, Alsfeld (DE)

( * ) Notice: Subject to any disclaimer, the term of this patent is extended or adjusted under 35 U.S.C. 154(b) by 36 days.

(21) Appl. No.: 13/817,267

(22) PCT Filed: Jul. 5, 2011

(86) PCT No.: PCT/DE2011/001407
§ 371 (c)(1),
(2), (4) Date: Feb. 15, 2013

(87) PCT Pub. No.: WO2012/028124
PCT Pub. Date: Mar. 8, 2012

(65) Prior Publication Data
US 2013/0142576 A1  Jun. 6, 2013

(30) Foreign Application Priority Data
Sep. 1, 2010  (DE) .......................... 10 2010 035 990

(51) Int. Cl.
*E02D 5/54* (2006.01)
*E02D 5/28* (2006.01)
(Continued)

(52) U.S. Cl.
CPC *E02D 5/54* (2013.01); *E02D 5/285* (2013.01); *E02D 7/16* (2013.01); *E02D 7/18* (2013.01); *E02D 7/22* (2013.01); *E02D 27/16* (2013.01); *F24J 2/52* (2013.01); *F24J 2/525* (2013.01)

(58) Field of Classification Search
CPC ............... E02D 5/54; E02D 7/28; E02D 7/30; E02D 5/285; E02D 7/16; E02D 7/18
USPC .............. 405/232, 245, 246, 247; 173/1, 184; 254/134.3 R; 81/57.15, 57.33
See application file for complete search history.

(56) References Cited

U.S. PATENT DOCUMENTS 3,507,338 A * 4/1970 Alexander et al. .............. 173/28
4,515,522 A * 5/1985 Sonerud ..................... 414/745.4
(Continued)

FOREIGN PATENT DOCUMENTS

DE  33 38 144 A1  10/1984
DE  33 38 144 C2  3/1989
(Continued)

*Primary Examiner* — Benjamin Fiorello
*Assistant Examiner* — Kyle Armstrong
(74) *Attorney, Agent, or Firm* — McGlew and Tuttle, P.C.

(57) ABSTRACT

A method for gradually introducing thin-walled pipes into the ground includes inserting a pipe clamp, which has been arranged horizontally on a mast, into a horizontal pipe, bracing the pipe clamp (pipe gripping jaw) with the rear part of the pipe, moving the pipe clamp back with the pipe braced thereon, erecting the mast, with the tools, the pipe clamp and the pipe, into a vertical position, introducing the pipe to the desired depth with the tools, unclamping the pipe clamp and pulling it out of the pipe, and repositioning the mast back into a horizontal position. A device has a carrier unit, a mast, which can be pivoted between vertical and horizontal, tools with a pipe clamp, arranged on the mast, and a magazine a pipe arranged substantially horizontally. The pipe clamp is inserted into the pipe coaxially in relation to the pipe and substantially horizontally.

16 Claims, 5 Drawing Sheets

(51) Int. Cl.
*E02D 7/16* (2006.01)
*E02D 7/18* (2006.01)
*E02D 7/22* (2006.01)
*E02D 27/16* (2006.01)
*F24J 2/52* (2006.01)

(56) References Cited

U.S. PATENT DOCUMENTS

| | | | | |
|---|---|---|---|---|
| 4,682,912 A | * | 7/1987 | Henry | 405/184.5 |
| 5,012,873 A | * | 5/1991 | Kennedy et al. | 173/185 |
| 5,332,047 A | * | 7/1994 | Hignite | 173/1 |
| 6,672,805 B1 | | 1/2004 | White | |
| 6,808,029 B2 | * | 10/2004 | De Lille | 175/52 |
| 6,814,525 B1 | * | 11/2004 | Whitsett | 405/233 |
| 6,896,072 B2 | * | 5/2005 | MacDonald | 173/192 |
| 6,981,559 B2 | * | 1/2006 | Rubie et al. | 173/184 |
| 2012/0073107 A1 | | 3/2012 | Köcher et al. | |

FOREIGN PATENT DOCUMENTS

| | | |
|---|---|---|
| DE | 60 116 091 T2 | 8/2006 |
| DE | 10 2009 008 581 A1 | 8/2010 |
| EP | 0 940 506 A1 | 9/1999 |

* cited by examiner

METHOD AND APPARATUS FOR GRADUALLY INTRODUCING THIN-WALLED PIPES INTO THE GROUND

CROSS REFERENCE TO RELATED APPLICATIONS

This application is a United States National Phase application of International Application PCT/DE2011/001407 and claims the benefit of priority under 35 U.S.C. §119 of German Patent Application DE 10 2010 035 990.4 filed Sep. 1, 2010, the entire contents of which are incorporated herein by reference.

FIELD OF THE INVENTION

The present invention pertains to a process for gradually inserting thin-walled pipes into the ground as well as to a device herefor.

BACKGROUND OF THE INVENTION

Processes and devices for making the foundation for steel sections are already known according to the state of the art. The stable, thick-walled sections are usually unloaded for this from a transport surface of a vehicle with a hoisting gear and subsequently aligned vertically one by one. Various devices for vertically aligning sections are described in the state of the art. For example, a threading-up device at a vibrator for driven sections is disclosed in DE 3338144 C2. The section is connected by means of a chain to the driving device, which is in turn arranged on a mast such that it is able to travel. The section is aligned by the driving device moving up and pulled into the clamping device in a vertically hanging position by means of a cable, so that the section can subsequently be driven in vertically.

Both the process described for erecting and for inserting the sections is disadvantageous especially for thin-walled pipes, because the upper edge of the pipes may be damaged by the high pressure while the pipes are being inserted by vibration. In addition, kinking of the pipe is possible depending on the nature of the ground. Furthermore, the lower edge of the pipe is being dragged over the ground during the vertical erection, so that the lower edge of the pipe is damaged as well.

To avoid damage to the pipes especially during insertion, a pipe gripping jaw, which is inserted into the pipe in order to clamp it at the lower end thereof, is disclosed in DE 102009008581. However, the mast must have a length equaling at least twice the pipe length for this in order to be able to pick up the pipe with the mast in the vertical position, which is associated with the carrier device having large dimensions. Such an insertion of the pipes is relatively time-consuming, labor-consuming and expensive as a result.

SUMMARY OF THE INVENTION

An object of the present invention is therefore to provide a process and a device with which the above-mentioned drawbacks are eliminated, so that a plurality of thin-walled pipes can be inserted into the ground in a short time and with the lowest manpower demand possible.

In particular, the process and the device shall be suitable for making the foundation for the carriers for individual heliostats of solar tower power plants or photovoltaic plants tracking the sun. Solar tower power plants are steam power plants which generate steam with solar energy. Hundreds to thousands of automatically positioned mirrors (heliostats) are aligned during sunshine such that the sunlight is reflected onto a central absorber at the tip of a tower. Temperatures of up to several thousand degrees Celsius develop due to the intense concentration of the solar radiation. A heat carrier medium being passed through the absorber is heated, evaporates and is used to generate power by being sent to a steam turbine. The plants are built in areas of a mostly desert-like character with a lot of sunshine.

One important and essential cost item in building such a solar tower power plant is the foundation of the carriers for the individual heliostats of the plant. The grid of positioning the individual mirrors is highly variable and complicated. The foundation of such a plant is therefore designed, as a rule, as an individual foundation for each heliostat. Individual concrete foundations, in which corresponding carriers are then set in concrete or onto which the carriers are screwed, are suitable here, said carriers then being used to mount the motor operators with control for tracking the mirrors corresponding to the position of the sun. The foundation of a heliostat on an individual concrete foundation with the carrier screwed on is disadvantageously complicated, requires a plurality of operations, and the preparation of a concrete foundation is relatively expensive in desert-like regions with correspondingly low water reserves.

According to the present invention, the process has the following steps:
a) Insertion of a pipe gripping jaw arranged horizontally on a mast into a horizontally positioned thin-walled pipe,
b) Bracing of the pipe gripping jaw with the rear part of the pipe,
c) Extracting of the pipe gripping jaw with the pipe braced thereon,
d) Erection of the mast with the tools, the pipe gripping jaw and the pipe into a vertical position,
e) Insertion of the pipe to the desired depth by means of the tools,
f) Releasing and pulling out of the pipe gripping jaw from the pipe inserted, and
g) Returning the mast into a horizontal position.

In order for the pipes that were previously inserted and partly protrude from the ground not to interfere with the further process, the travel path of the carrier device is preferably arranged offset in relation to the points at which the pipes are inserted. Thus, provisions are preferably made for inserting the pipes for the upper carriage to be pivoted about a vertical axis via a live ring before or during the erection of the mast and to be pivoted back after or during the lowering of the mast, which does, furthermore, save more time in the course of the process.

To further expedite the process, provisions are made according to a preferred embodiment for the next point of insertion, where a next thin-walled pipe will be inserted, to be reached during the above-mentioned process steps a, b, c, d and/or g. The carrier device is controlled now either by hand or automatically by means of a GPS system.

According to the present invention, the device has a carrier device, a mast, which is mounted pivotably between a vertical direction and a horizontal direction, wherein tools with a pipe gripping jaw are arranged displaceably on a mast, and a magazine with at least one thin-walled pipe, which is arranged essentially horizontally, wherein the pipe gripping jaw is positioned coaxially with the thin-walled pipe and essentially horizontally when the pipe gripping jaw is inserted into the pipe. A device, with which a plurality of thin-walled pipes can be inserted into the ground rapidly and a simple manner, is proposed hereby.

The device according to the present invention is especially suitable for the partial foundation of thin-walled pipes, so that the part of a pipe that is not inserted can be used, for example, as a carrier for motor actuators for adjusting heliostats. Only one operation is advantageously necessary for this.

To insert the pipes, the pipe gripping jaw passes preferably completely through the pipe and is braced with the pipe at the end located opposite the tools. As a result, the pipes are subject to less stress during insertion, so that thin pipes, which are inexpensive and comparatively sensitive, can also be used without buckling during insertion, which frequently happens during the conventional insertion by vibration depending on the nature of the ground. Another advantage arises from the fact that the upper part of the pipes, on which the gripping jaws usually act, remains undamaged by the insertion with the pipe gripping jaw, so that any mounts for motor actuators and switch boxes belonging to them for the control, for example, holes or welded-on bolts, can be arranged on the pipes in advance, so that the subsequent mounting of the motor actuators can be carried out without finishing operations or without major finishing operations.

Finally, the mast can be made substantially shorter and hence more compact, because it is arranged horizontally during the insertion of the pipe gripping jaw and the mast does not have to project over the pipe in the vertical position by the length of the pipe gripping jaw plus the length of the tools.

The magazine, in which the thin-walled pipes are being stored, is preferably arranged on a trailer of the carrier device, with a plurality of pipes being provided next to each other in one lane. Rapid change of the magazine is possible as a result, for which either the complete trailer or only one magazine made available is replaced. As an alternative hereto, the magazine may also be arranged on the carrier device itself, which is made relatively long in this case.

In order for the device according to the present invention to function smoothly, the pipe gripping jaw and the pipe to be inserted must be brought into a coaxial position for the pipe gripping jaw to be able to be inserted into the pipe and braced there. According to a preferred embodiment, the planes of the magazine have a V-shaped design for this, the magazine being mounted pivotably about the longitudinal axis. In other words, the magazine is mounted rotatably about a non-stationary longitudinal axis, for which purpose the magazine is arranged on lifting cylinders. These may be provided on the right side and on the left side or even in front of and behind as well as below the magazine. However, other pivotable arrangements of the magazine are also conceivable, for example, a hanging mounting on a frame. In addition, the lifting cylinders may also be replaced with threaded spindles or similar devices. A pipe can always be rolled into the V-shaped depression of the plane thanks to the pivotable mounting, so that the pipe gripping jaw can be inserted into the pipe. Complicated positioning devices with controlled gripping arms, as they are known from the state of the art, are eliminated as a result.

According to an advantageous embodiment, a plurality of planes are provided per magazine, and the planes and the magazine are connected with a lifting device. The lifting device is used to raise or lower the planes containing the pipes, so that the pipes are positioned correctly for being received by the pipe gripping jaw. The lifting cylinders, with which the pivoting motion of the magazine is performed, may preferably also be used for this. On the whole, a flexible storage possibility is created hereby for thin-walled pipes, and the path from the storage site to the point of insertion, i.e., the point where the pipe is inserted into the ground, is reduced to a minimum. A considerable amount of time is saved hereby.

As an alternative to this, other embodiments of magazines are conceivable as well. For example, the individual planes could be designed such that they decline in the direction of a lifting device, so that a pipe will always roll onto the lifting device when the previous pipe was removed. The magazine can be advantageously filled up in both embodiments without the work process having to be interrupted hereby.

According to another preferred embodiment of the present invention, the carrier device is a tracked vehicle or a wheeled vehicle with a superstructure rotatable relative to the chassis, wherein a selection can be made between the carrier devices mentioned depending on the nature of the ground.

The mast preferably has additional degrees of freedom in all directions in a vertical position in order to compensate slightly oblique positions of the chassis that may possibly occur due to unevennesses of the terrain such that its position will remain vertical.

According to another embodiment of the present invention, the tools for inserting the pipes are a vibrating ram or a power rotary head. A power rotary head is preferably used when rocky or rock-like grounds prevent insertion by vibration. The pipe gripping jaw is connected with the power rotary head via a flange subjected to torsion. A drill bit is then arranged at the tip of the pipe gripping jaw.

Further preferred embodiments as well as concrete embodiments of the present invention will be explained below on the basis of the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2b is a top schematic view of the device shown in FIG. 2a, in the situation shown in FIG. 2a;

DESCRIPTION OF THE PREFERRED EMBODIMENTS

Figure 1:
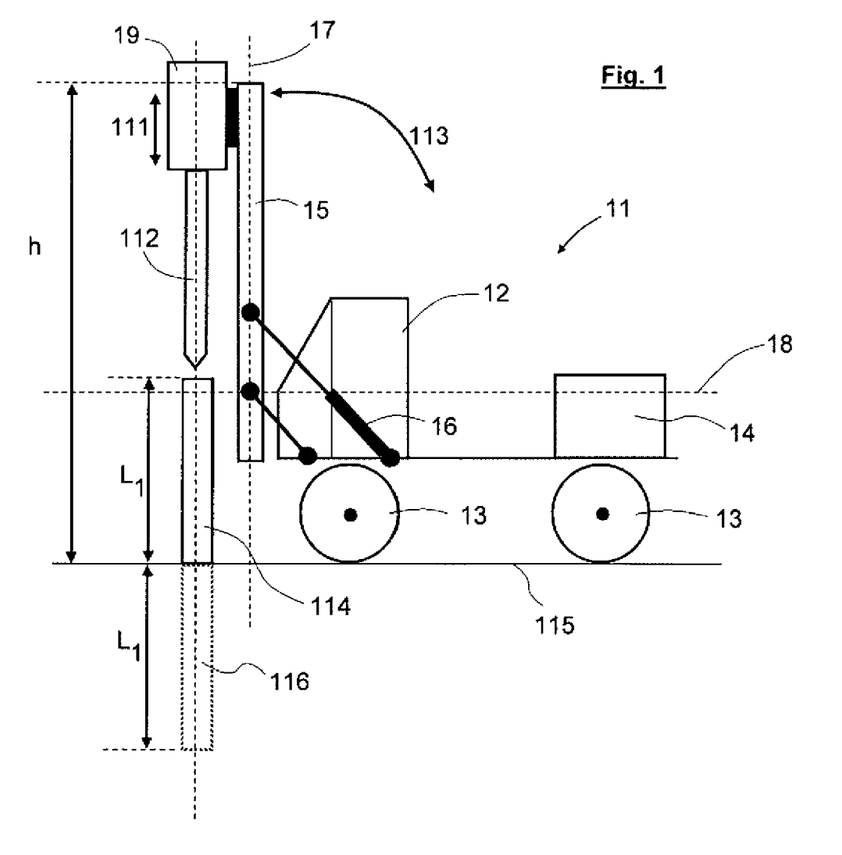
FIG. 1 is a schematic side view showing a carrier device with a mast as well as with tools displaceable thereon.

Referring to the drawings in particular, FIG. 1 shows a usual situation during the insertion of a pipe by vibration with conventional devices. These have a carrier device 11 with a cab 12, wheels 13 as well as a motor 14. In addition, a mast 15 is provided, which can be pivoted by means of a lifting cylinder 16 from a vertical direction 17 into a horizontal direction 18 and vice versa (arrow 113). Tools 19 are arranged displaceably (arrow 111) on mast 15, and said tools 19 have a pipe gripping jaw 112. To drive the pipe 114 into the ground 115 up to the position 116 represented by dotted line, pipe 114 is first erected, so that the pipe gripping jaw 112 can be inserted into pipe 114 from the top. The maximum length $L_1$ of the pipes 114 to be driven is greatly limited hereby, and the length $L_1$ of the pipes 114 depends on the height h of the mast 15.

Figure 2A:
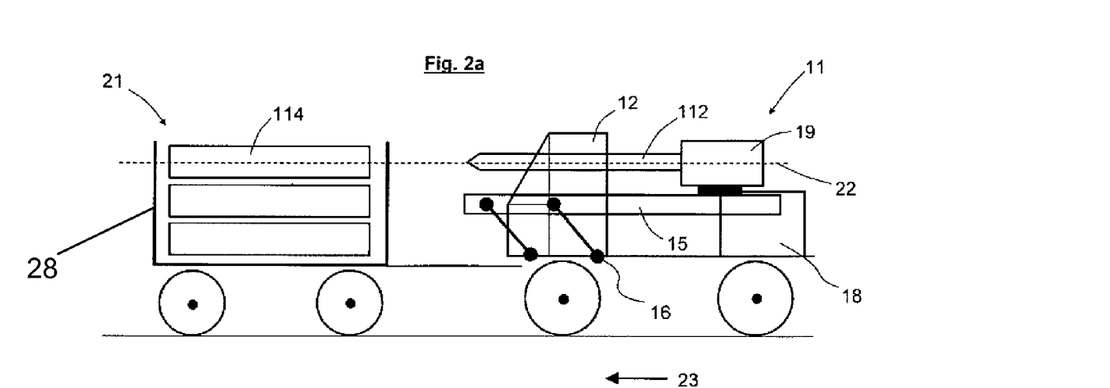
FIG. 2a is a side schematic view of the device according to the present invention.

FIGS. 2a through d show a concrete exemplary embodiment of a device according to the present invention as well as the course of the process according to the present invention. Accordingly, the device has a magazine 21 with at least one thin-walled pipe 114, which is arranged essentially horizontally, wherein the pipe gripping jaw 112 and the thin-walled pipe 114 are arranged coaxially in relation to the axis 22 when the mast 15 and hence the pipe gripping jaw 112 are aligned horizontally, as this is shown in FIG. 2a. The magazine 21 may be arranged on a trailer 28.

Figure 2B:
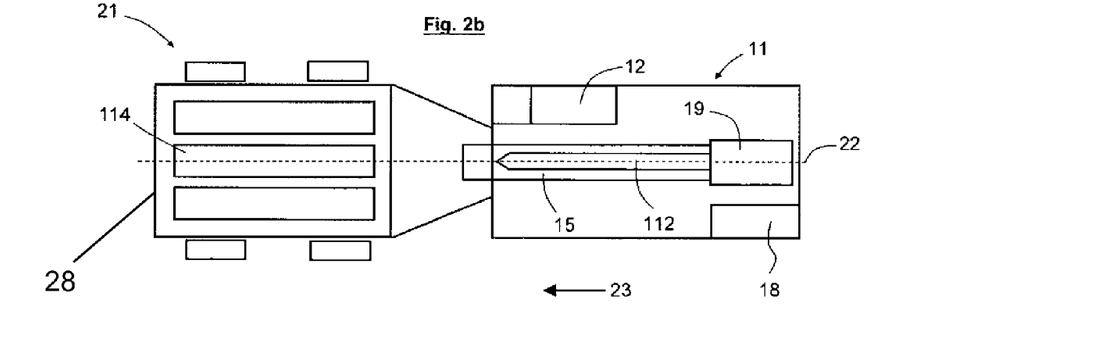
Figure 2C:
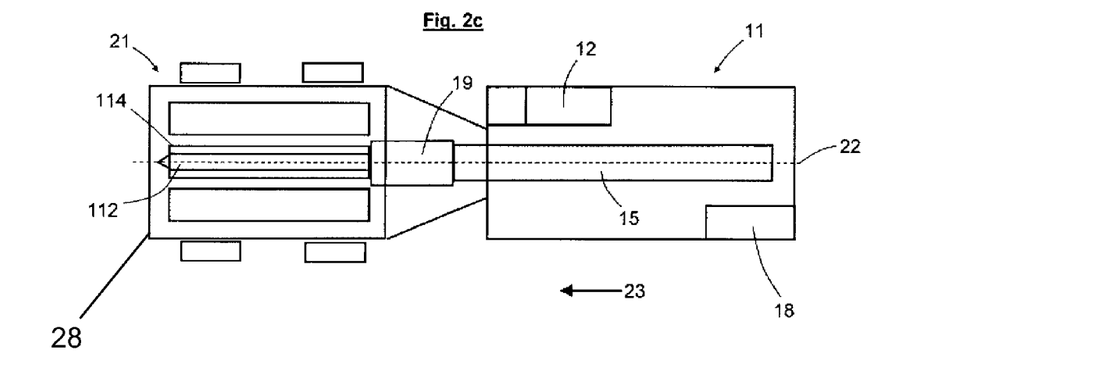
FIG. 2c is a top schematic view of the device shown in FIG. 2a, showing the pipe gripping jaw displaced.

FIG. 2b shows the same situation in a top view. The pipe gripping jaw 112 can be displaced together with the tools 19 in the direction of arrow 23 to the extent that the pipe gripping jaw 112 passes completely through the pipe 114 (FIG. 2c), so that the pipe 114 can be retracted and erected together with the pipe gripping jaw 112 against the direction of arrow 23. Simultaneously or subsequently hereto, the superstructure 24 is pivoted about the point 25 (FIG. 2d, arrows 26), so that the pipe 114 is inserted in the correct position 27.

Figure 2D:
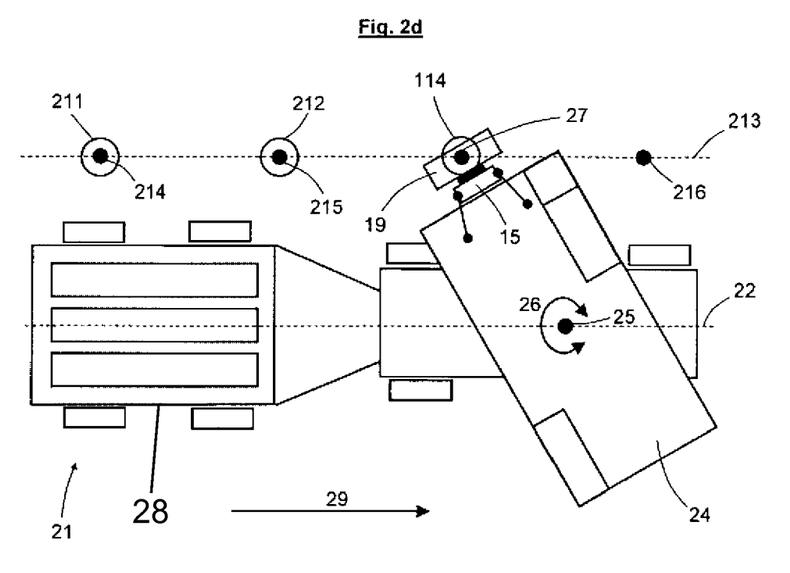
FIG. 2d is a top schematic view of the device shown in FIG. 2a, showing the pivoting of superstructure.

In addition, FIG. 2d shows the procedure of the process. In order for the pipes 211, 212 already inserted and partly projecting from the ground 115 not to interfere with the further process, the travel path is arranged along axis 22 offset in relation to line 213 with the points of insertion 214, 215, 27, 216.

Figure 2E:
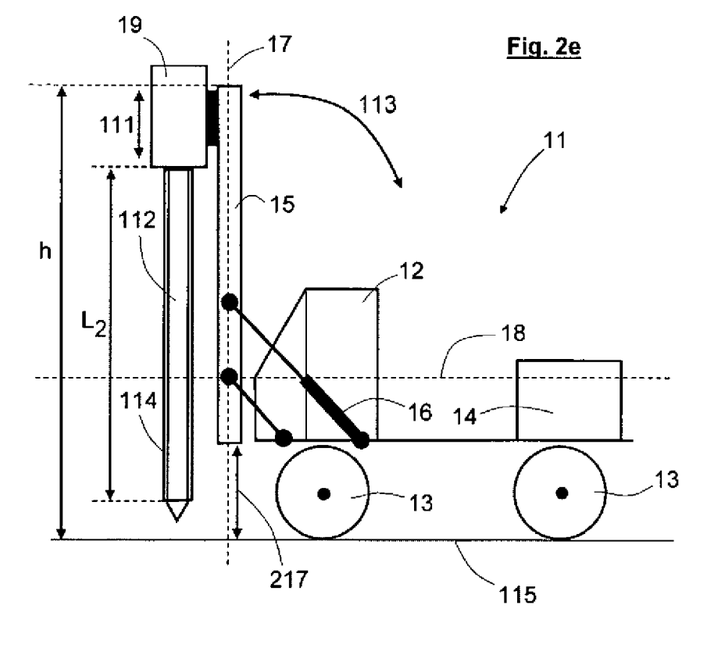
FIG. 2e is a side schematic view of the device shown in FIG. 2a, showing the insertion of a pipe with a carrier device of the device according to the present invention.

The insertion of pipe 114 with the carrier device of the device according to the present invention is shown schematically in FIG. 2e. Due to the fact that the insertion of the pipe gripping jaw 112 and the bracing is carried out in a horizontal position, a substantially longer pipe 114 can be inserted into the ground with the same device as shown in FIG. 1, using only a longer gripping jaw 112 for this. The length $L_2$ is approximately twice the length $L_1$ in the exemplary embodiment being shown.

In general terms, the necessary travel path of the tools 19 at the mast 15 is obtained from the pipe length $L_2$ plus the length of the pipe section projecting from the ground (not shown) minus the measure of the ground clearance 217 of mast 15 in the vertical position.

Figure 3A:
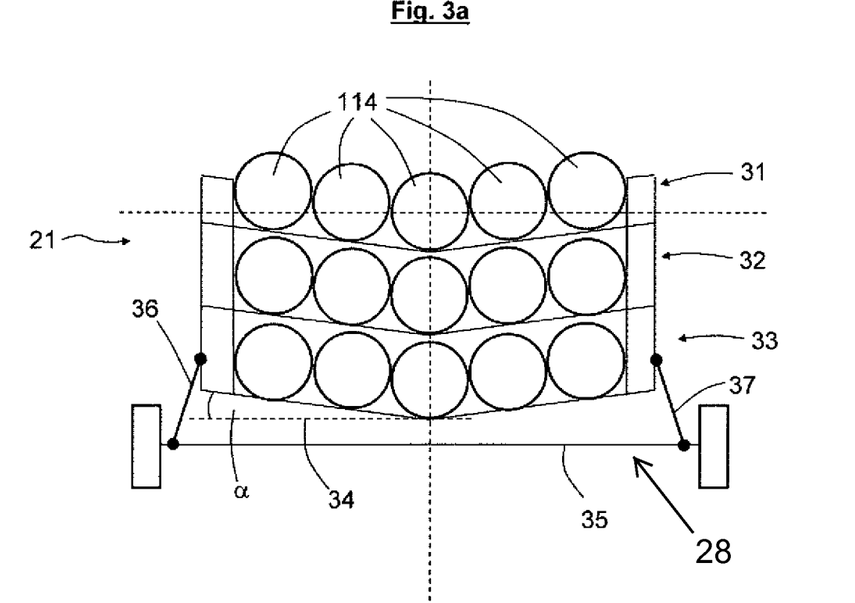
FIG. 3a is a schematic view of an embodiment of a magazine according to the present invention.
Figure 3B:
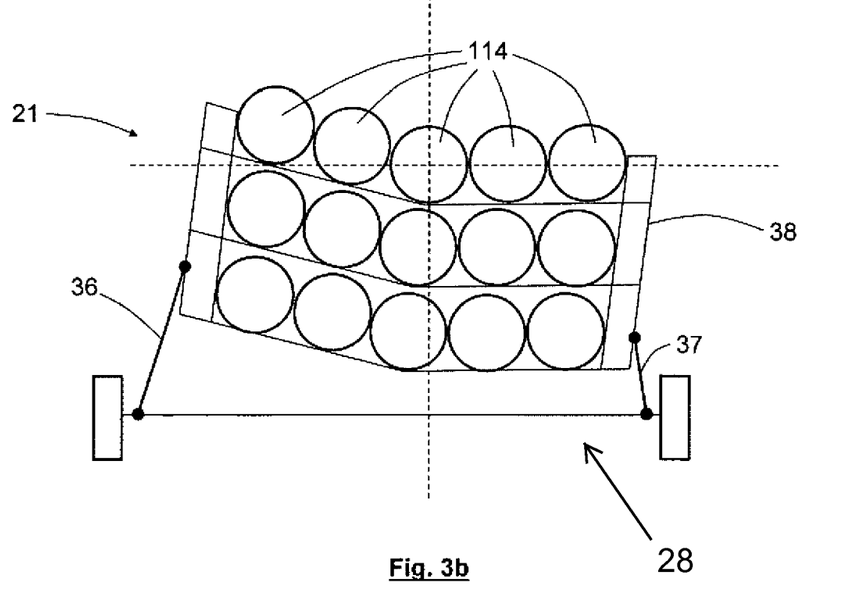
FIG. 3b is a schematic view of another embodiment of a magazine according to the present invention.

A concrete exemplary embodiment of a magazine 21 has a U-shaped cross section as well as a plurality of V-shaped planes (layers) 31, 32, 33, wherein the angle α relative to the horizontal 34 is approximately 5° (FIGS. 3a, b). Magazine 21 is connected with the chassis 35. Cylinders 36, 37 each are fastened on the left and right of the magazine 21 in order to make it possible to raise the magazine 21 and/or to bring it into an oblique position (FIG. 3b).

Figure 3C:
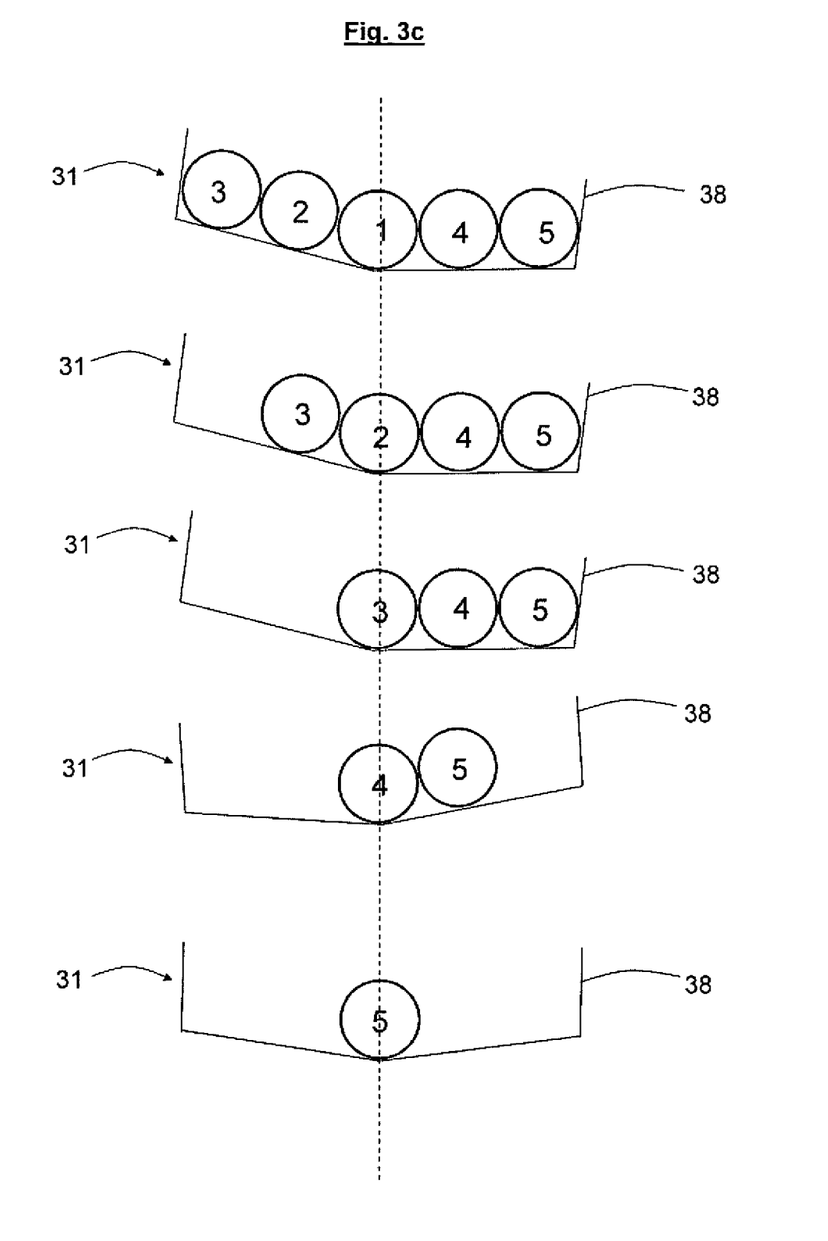
FIG. 3c is a schematic view of an embodiment of a magazine according to the present invention.

A concrete process for removing the pipes is schematically shown in FIG. 3c. Magazine 21 is at first raised on one side by the cylinders 36 such that all pipes 1, 2, 3, 4, 5 roll to the wall 38. At the beginning of work, the magazine is arranged such that the pipe 1 is arranged in the middle of the topmost plane 31 coaxially with the pipe gripping jaw 112, so that this pipe 1 can be braced with the pipe by a feed of the tools 19 on the mast 15 in the direction of the magazine 21. Due to the subsequent removal of the middle pipe 1 and the corresponding slope of the U-shaped magazine or of the V-shaped plane, the next pipes 2, 3 will then roll into the middle. The pipes of one side are thus taken up in the work process. If the last pipe 3 of one side has been inserted, the oblique position of magazine 21 is eliminated, so that the pipes 4, 5 of the other side of the planes will now roll to the middle, where they are likewise taken up with the pipe gripping jaw 112.

If all pipes 1 through 5 of the topmost plane have been inserted, the U-shaped magazine 21 is raised by all cylinders 36, 37 or by another lifting device (not shown) such that the middle pipe of the next plane is arranged coaxially with the pipe gripping jaw 112, after which the steps described before are repeated. The upper plane 31 can meanwhile be refilled with new pipes.

The number of pipes 114 of one plane 31, 32, 33 can be expanded as desired depending on the dimensioning of the magazine 21 or the pipe diameter. The number of planes 31, 32, 33 is likewise not limited, in principle.

While specific embodiments of the invention have been shown and described in detail to illustrate the application of the principles of the invention, it will be understood that the invention may be embodied otherwise without departing from such principles.

The invention claimed is:

1. A process for gradually inserting thin-walled pipes into the ground, the process comprising the steps of:
   inserting a pipe gripping jaw, arranged horizontally on a mast, into a horizontally positioned thin-walled pipe;
   bracing the pipe gripping jaw with a rear part of the thin-walled pipe, wherein to engage the thin-walled pipe, the pipe gripping jaw passes completely through the thin-walled pipe and the step of bracing is accomplished by the thin-walled pipe being braced at an end located opposite the tools;
   retracting the pipe gripping jaw with the thin-walled pipe braced thereto;
   erecting the mast with tools such that the pipe gripping jaw and the thin-walled pipe are moved into a vertical position;
   inserting the thin-walled pipe to a desired depth by means of the tools;
   releasing and pulling out the pipe gripping jaw from the inserted thin-walled pipe; and
   returning the mast into a horizontal position.

2. The process in accordance with claim 1, wherein a superstructure is pivoted via a live ring about a vertical axis before or during the step of erecting the mast and is pivoted back after or during the step of returning the mast.

3. The process in accordance with claim 1, wherein a next point of insertion, where a next thin-walled pipe is inserted, is reached during at least one of the steps of inserting the pipe gripping jaw into the thin-walled pipe, bracing the pipe gripping jaw, retracting the pipe gripping jaw, erecting the mast and returning the mast.

4. A device for gradually inserting thin-walled pipes into the ground, the device comprising:
   a carrier device;
   a mast, which is mounted pivotably to the carrier device for movement between a vertical direction and a horizontal direction;
   tools, with a pipe gripping jaw, arranged displaceably on the mast; and
   a magazine with at least one essentially horizontally arranged thin-walled pipe, wherein the pipe gripping jaw is positioned coaxially with the thin-walled pipe and essentially horizontally during the insertion of the pipe gripping jaw into the thin-walled pipe, wherein to clamp the thin-walled pipe, the pipe gripping jaw passes completely through the thin-walled pipe and is braced with the thin-walled pipe at an end located opposite the tools.

5. The device in accordance with claim 4, wherein:
the carrier device includes a trailer;
the magazine is arranged on the trailer of the carrier device; and
a plurality of said thin-walled pipes are provided next to each other on one or more planes in the magazine.

6. The device in accordance with claim 5, wherein:
the planes have a V-shaped design; and
the magazine is pivotably connected to said carrier device.

7. The device in accordance with claim 5, further comprising a lifting device wherein:
a plurality of said planes are provided one on top of another; and
the magazine is connected with the lifting device.

8. The device in accordance with claim 4, wherein the carrier device comprises a tracked vehicle or a wheeled vehicle with a superstructure rotatable relative to a chassis.

9. The device in accordance with claim 4, wherein the tools are a vibrating ram or a power rotary head.

10. A process for gradually inserting thin-walled pipes into the ground the process comprising the steps of:
providing a device for gradually inserting thin-walled pipes into the ground comprising a carrier device, a mast mounted pivotably to the carrier device for movement between a vertical direction and a horizontal direction, tools, with a pipe gripping jaw, arranged displaceably on the mast and a magazine with an essentially horizontally arranged thin-walled pipe, wherein the pipe gripping jaw is positioned coaxially with the thin-walled pipe and essentially horizontally during the insertion of the pipe gripping jaw into the thin-walled pipe;
inserting the pipe gripping jaw into the horizontally positioned thin-walled pipe;
bracing the pipe gripping jaw with a rear part of the thin-walled pipe, wherein to engage the thin-walled pipe, the pipe gripping jaw passes completely through the thin-walled pipe and the step of bracing is accomplished by the thin-walled pipe being braced at an end located opposite the tools;
retracting the pipe gripping jaw with the thin-walled pipe braced thereto;
erecting the mast with the tools such that the pipe gripping jaw and the thin-walled pipe are moved into a vertical position;
inserting the thin-walled pipe to a desired depth by means of the tools;
releasing and pulling out the pipe gripping jaw from the inserted thin-walled pipe; and
returning the mast into a horizontal position.

11. The process in accordance with claim 10, wherein the carrier device comprises a tracked vehicle or a wheeled vehicle with a superstructure rotatable relative to a chassis.

12. The process in accordance with claim 10, wherein a next point of insertion, where a next thin-walled pipe is to be inserted, is reached during at least one of the steps of inserting the pipe gripping jaw into the thin-walled pipe, bracing the pipe gripping jaw, retracting the pipe gripping jaw, erecting the mast and returning the mast.

13. The process in accordance with claim 10, wherein:
the carrier device includes a trailer;
the magazine is arranged on the trailer of the carrier device; and
a plurality of said thin-walled pipes are provided next to each other in one or more planes, in the magazine.

14. The process in accordance with claim 13, wherein:
the planes have a V-shaped design; and
the magazine is pivotably connected to said carrier device.

15. The process in accordance with claim 13, wherein the device further comprises a lifting device wherein:
a plurality of said planes are provided one on top of another; and
the magazine is connected with the lifting device.

16. The process in accordance with claim 10, wherein the tools are a vibrating ram or a power rotary head.

\* \* \* \* \*